May 4, 1965

H. G. LEUPOLD 3,182,146

TEMPERATURE RESPONSIVE CONTROL HAVING A BELL-CRANK
LEVER AND A RIGID MOTION-TRANSMITTER PIVOTALLY
MOUNTED THEREON

Filed Jan. 9, 1961

INVENTOR.
Henry G. Leupold
BY
Roberts Cushman & Grover
ATT'YS

INVENTOR.
Henry G. Leupold
BY
ATT'YS

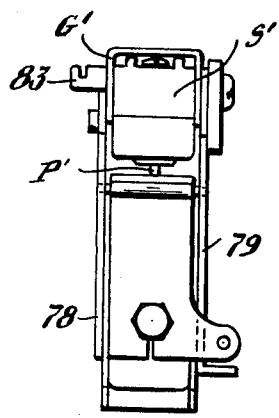
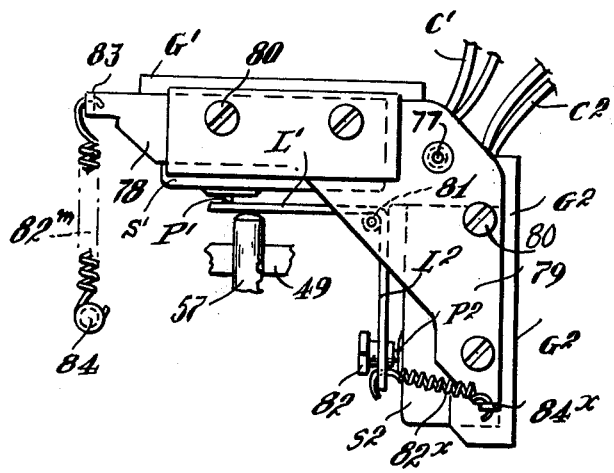
Fig. 6
Fig. 5
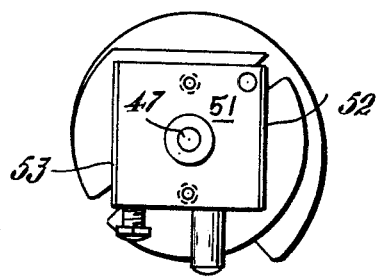
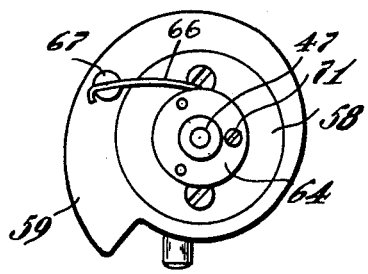
Fig. 7
Fig. 8
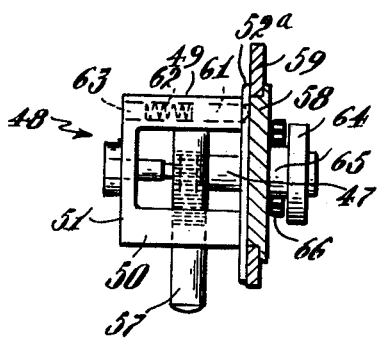
Fig. 9
INVENTOR.
Henry G. Leupold

United States Patent Office 3,182,146
Patented May 4, 1965

3,182,146
TEMPERATURE RESPONSIVE CONTROL HAVING A BELL-CRANK LEVER AND A RIGID MOTION-TRANSMITTER PIVOTALLY MOUNTED THEREON
Henry G. Leupold, Arlington, Mass., assignor to United Electric Controls Company, Watertown, Mass., a corporation of Massachusetts
Filed Jan. 9, 1961, Ser. No. 81,311
6 Claims. (Cl. 200—56)

This invention pertains to indicating and/or recording controls, for instance, of the remote reading type and constitutes an improvement upon the control which is disclosed and claimed in the copending application of Henry G. Leupold, Serial No. 19,714, filed April 4, 1960.

Herein, for purpose of illustration, but without limitation, the instrument is shown, and will be described, with reference to its embodiment in a thermostat for use in the control of apparatus which may be remote from the instrument itself. The instrument of the present invention as herein disclosed, for illustrative example, comprises a pointer which moves over a graduated scale, in response to temperature change; a main switch of the snap-action type which is operative to open or close a circuit whereby the operation of a heat-supplying means is controlled; a second switch, operative under circumstances (for instance closing a signal circuit) subsequent to the operation of the main switch; and adjusting means cooperable with the graduated dial for determining the temperature at which the main switch will be actuated.

Among the objects of the invention are to provide control apparatus, of the above type, having provision whereby, if as the result of its normal operation the control apparatus fail to produce the desired result, a signal will be activated to give notice of such failure. Thus, for specific example, if the control apparatus be set to operate its main switch to cut off the supply of heat to a processing apparatus or the like when a predetermined temperature has been reached, but fails to accomplish the intended result, a second switch will be actuated to close an alarm circuit. A further object is to provide apparatus, of the above type, wherein two switches are so arranged as to be actuated successively at a predetermined temperature differential and wherein, when the one switch is adjusted to respond to a selected temperature, the second switch will likewise be adjusted automatically so as to maintain said predetermined temperature differential. Other and further objects and advantages of the invention will be pointed out in the following more detailed description and by reference to the accompanying drawings wherein:

FIG. 5 is a front elevation of the switch assembly removed from the chassis but indicating a portion of the temperature-controlled element in its operative relation to the switch assembly;

FIG. 6 is an elevation of the switch assembly viewed from the right-hand side of FIG. 5;

FIG. 7 is a rear elevation of the chassis which supports the bearings for the shaft on which the pointer is mounted and the mechanism for turning said shaft;

FIG. 8 is a front elevation of the parts shown in FIG. 9, showing the front end of the pointer shaft and also the switch-adjusting cam; and FIG. 9 is a vertical section, partly in side elevation, of the device shown in FIG. 7.

Figure 1:
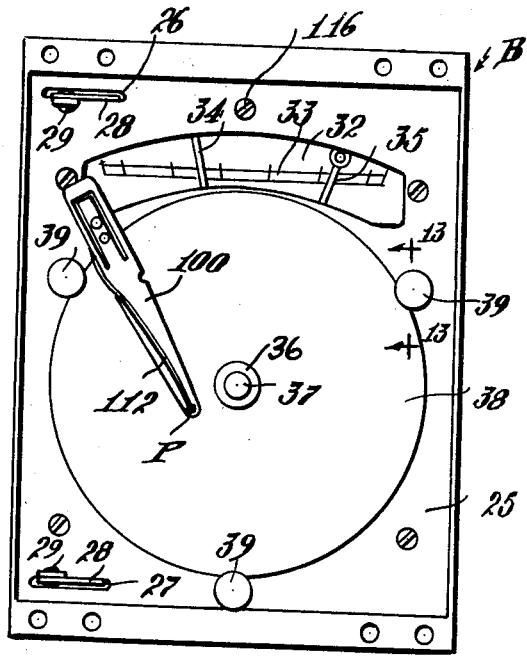
FIG. 1 is a front view of the control as it appears when in use.

Referring particularly to FIGS. 1 to 4 of the drawings, the control apparatus is shown as having a casing or housing B for the operative instrumentalities, this housing, as here illustrated, being substantially rectangular, having a top wall, a bottom wall, a rear wall, a left-hand side wall, a right-hand side wall, and a front closure 25 which, as here disclosed, is a hinged door. This housing is desirably made of sheet metal of a suitable stiffness and rigidity to support the operative parts in proper position and to protect them from mechanical or other injuries.

The front closure or door 25 is supported by two brackets 26 and 27 (FIG. 2), attached, respectively, to the top and bottom walls of the housing.

At its upper part the door has an elongate slot 32 (FIG. 1) through which there is exposed the graduated scale 33, with which there cooperates the movable pointer 34 which is moved along the scale in response to variation in temperature. An adjusting member 35 also cooperates with the scale for adjusting the apparatus to respond to a temperature corresponding to the setting of this adjusting member 35.

Figure 4:
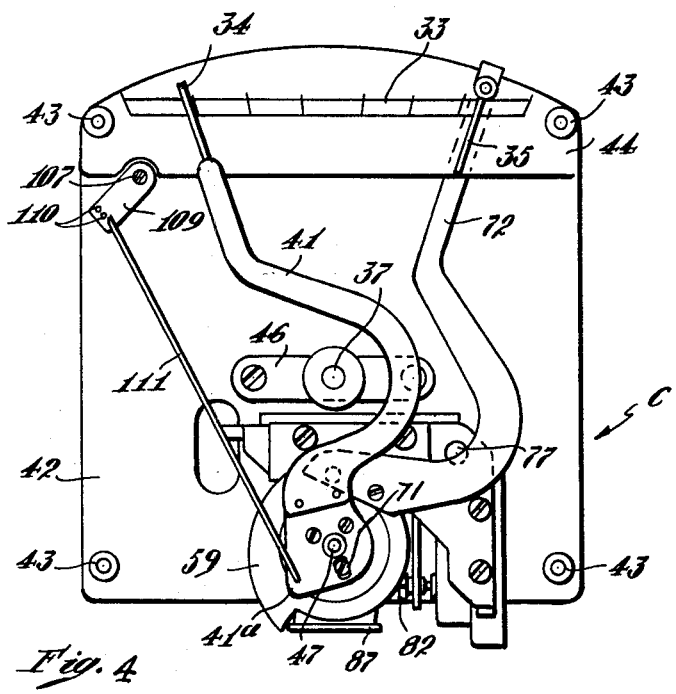
FIG. 4 is a front view of the chassis which supports the operative mechanism as it appears when removed from the door.

Most of the moving parts of the apparatus are supported upon a chassis C (FIG. 4) comprising a rigid rear plate 42 (FIGS. 2 and 4), which is connected by rigid posts 43 to the door 25, so that the plate 42 is held securely and in parallel relation to the door. There are four of the posts 43 located, respectively, at the corners of the rectangular plate 42. The two upper posts 43 support a plate 44 disposed directly behind the opening 32 in the cover and whose front face is graduated to form the scale 33. The rear plate 42 of the chassis also has two rigid parallel posts 45 (FIG. 2) projecting forwardly and which support a transverse plate 46 (FIGS. 2 and 4) which provides the outboard or forward bearing for the shaft 37 which carries the recording disc 38. The rear bearing for the shaft 37 is provided in the casing of the motor M (FIG. 3) which drives the shaft 37. Desirably, the rear end (not shown) of the shaft 37 is polygonal in transverse section and is received in a socket on a short shaft driven by the motor, the latter being a clock motor of the synchronous type supplied with current through the conductors T (FIGS. 4 and 5).

The shaft 47 (FIG. 9), to which the arm 41 of the temperature indicator 34 is secured, has bearings in a box 48, which is secured to the plate 42 of the chassis. As shown in FIG. 10, this box comprises a top wall 49, a bottom wall 50 and a rear wall 51, which, as here shown, are parts of a rigid casting. The right and left-hand sides of the box are closed by removable sheet metal plates 52 and 53 (FIG. 8). Another sheet metal plate 52a (FIG. 9) is secured to the forward edges of the top and bottom members 49 and 50 and provides the forward bearing for the shaft 47, the rear bearing of this shaft being provided in the rear wall 51 of the box.

Between its bearings the shaft is provided with a toothed portion constituting a spur gear which meshes with a rack formed on a vertically movable bar 57, which is guided to slide in openings in the top and bottom walls 49 and 50 of the box, as more fully disclosed in the patent to Leupold, 2,797,272, dated June 25, 1957.

A circular disc 58, desirably of hard rubber or the like, is fixed to the front plate 52 of the box. Mounted to turn on the edge of this disc is an adjusting cam 59. The rear wall 51 of the box is provided with a horizontal bore 60 which extends from rear to front, within which there slides a pin (FIG. 9), whose forward end passes through a slot in the plate 52 and frictionally engages the rear surface of the cam 59. A spring 62 in the bore 61, urges the pin forwardly, the rear end of the opening or bore 60 being closed by a plug 63 constituting an abutment for the rear end of the spring.

At its forward end the shaft 47 has fixed thereto a disc 64 and between this disc and the front of the stationary disc 58 there is a drum 65 fixed to the shaft 47, to which one end of a clock spring 66 is secured, the other end of the spring being secured to a pin 67 (FIG. 9) fixed to the cam 59. This clock spring is so arranged as to exert constant force tending to turn the shaft 47 in a counterclockwise direction and thereby to move the bar 57 downwardly.

Figure 2:
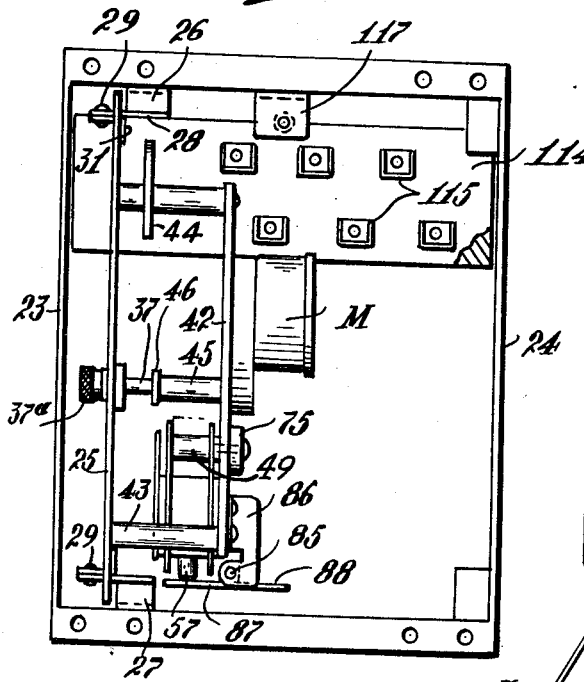
FIG. 2 is a front elevation of the apparatus with its front closure wide open to show the operative mechanism which is supported by the door.
Figure 3:
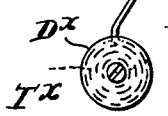
FIG. 3 is a rear elevation of the controller of the present invention.

The plate 42 of the chassis is provided at its rear side with a boss 75 (FIG. 2). This boss has a screw threaded bore, which receives the threaded rear end of a pivot member 77 which extends forwardly through a hole in plate 42 and forms a support for a switch carrier (FIGS. 5 and 6) comprising the two parallel plates 78 and 79. These plates are of substantially the same size and contour and are substantially L-shaped, with one arm horizontal and the other vertical. Between the horizontal arms of these plates there is arranged a switch $S^1$ (FIG. 6) which may be conventional snap-action type, having the downwardly directed, actuating pin $P^1$, while between the vertical arms of the plates 78 and 79 there is arranged a switch $S^2$ (FIG. 5) having the horizontally directed, actuating pin $P^2$. Desirably a guard member $G^1$ of inverted U-shape is arranged above the casing of the switch $S^1$, with its downwardly directed legs interposed between the switch casing and the plates 78 and 79, this guard member providing a chamber between it and the upper side of the switch for housing the lead wires $C^1$ for this switch. A similar guard $G^2$ provides a housing for the conductors $C^2$ for the switch $S^2$. The switches and the plates 78 and 79 are held in assembled relation by screws 80. As more fully described in applicant's above copending application, Serial No. 19,714, filed April 4, 1960, a part rigidly attached to the horizontal arm of one of the plates 78 or 79 rests upon and is held in firm contact with the peripheral edge of the cam 51 by the spring $82m$. Motion of the temperature-adjusting arm 35 along the scale 33 swings the lower end $72a$ of the lever 72 and thereby turns cam 59 and so tilts the switch $S^1$, thereby determining the initial or normal position of the switch pin $P^1$ relatively to the arm $L^1$ of the transmitter.

For co-ordinating the action of the two switches there is provided a motion transmitter of L-shape, comprising the horizontal arm $L^1$ and the vertical arm $L^2$, this device being pivotally mounted between the plates 78 and 79 by means of a pivot pin 81. The arm $L^1$ lies directly below the actuating pin $P^1$ of the switch $S^1$, while the arm $L^2$ is provided with a threaded opening which receives an adjusting screw 82, which is directly opposite the end of the pin $P^2$ of the switch $S^2$. A spring $82x$ connected at one end to the arm $L^2$ and at its other end to a lug $84x$ on frame member 79, normally holds the screw 82 in contact with pin $P^2$ with force sufficient to depress the pin and so break the circuit of switch $S^2$.

The pivot member 77 which supports the switch-carrying frame, is so located that the outer end portion of the arm $L^1$ is directly below the actuating pin $P^1$ of the switch $S^1$ and directly above the vertically movable rod 57. A spring $82m$ is attached at its upper end to a hook member 83 projecting from the left-hand end of the late 78, while its lower end is anchored to a fixed pin 84, this tension spring tending to swing the switch-carrying frame in a counterclockwise direction, such as to urge its actuating pin $P^1$ toward the arm $L^1$. A lever is pivotally supported at 85 (FIG. 2) by brackets 86 secured to the rear side of the chassis plate 42, this lever having one arm 87 which underlies the temperature-controlled bar 57 and whose other arm 88 is disposed directly below the lower end of a vertically movable element, here shown as the piston $88x$ (FIG. 3), sliding in the cylinder of a motor or prime mover $Mt$ which may, for example, be a motor device which is responsive to variations in a physical condition as, for instance, changes in pressure or temperature, and which may be of conventional type such, for example, as that more fully shown in the above copending application Serial No. 19,714, said motor comprising a cylinder which is connected by a capillary tube to a coil $Tx$ in a disc-like bulb or housing $Dx$.

Within the housing B (secured to the forward surface of the rear wall of the housing) is a bar 114 (FIG. 2) of insulating material to which suitable connectors 115 are attached for the reception of the terminals of the electrical conductors, which enter the housing through a hole in the rear wall of the latter. Normally the door 25 is kept closed by a screw 116 (FIG. 1) which passes through a hole in the door and into a threaded hole in a bracket 117 secured to the upper wall of the housing.

It is assumed that pin $P^1$ of the main switch $S^1$ is normally released and that said switch normally closes an electrical circuit and that so long as said circuit is closed, heat is being supplied to the controlled space (which may be a room, processing vat, oven, or the like), whereas when the actuating pin $P^1$ of said switch is depressed, the circuit is broken and the supply of heat to said space normally ceases. However, if for some fortuitous reason, after the depression of the switch pin $P^1$, the temperature in the controlled space continues to rise until it reaches the temperature to which the indicator 35 has been set (that is to say, a temperature higher than that at which the index 34 stands when the switch pin $P^1$ is automatically depressed), a rigid motion transmitter, comprising the parts $L^1$ and $L^2$ will be turned (clockwise) relatively to the switch supporting frame, thus releasing the pin $P^2$ of switch $S^2$ and so closing second circuit which may, for example, result in the sounding of an alarm; the lighting of a signal lamp; or the starting into operation of means for delivering cooling medium to the controlled space. By setting the indicator 35 at the desired point, the temperature differential between the maximum normal temperature in the controlled space and that at which the switch $S^2$ will function, may be varied at will. The adjustable contact 82 provides for initial calibration of the apparatus.

One utility of the herein-disclosed apparatus is for controlling the temperature of an incubator such as is employed in hospitals in the care of premature infants. For such use, the temperature-responsive motor $Mt$ may be connected to a sensitive thermometer coil $Tx$ (FIG. 4) mounted at one side of a disc $Dx$, for example, of plastic, which may be placed in contact with the infant's body and secured in position by adhesive tape.

While one desirable embodiment of the invention has herein been disclosed by way of example, it is to be understood that the invention is broadly inclusive of any and all modifications falling within the scope of the appended claims.

I claim:
1. Control apparatus of the class described which includes, in combination, a supporting structure, a prime mover mounted thereon, said prime mover comprising a movable element whose position varies with variations in a certain physical condition, a main switch and a secondary switch, each of said switches being of the snap-action type and having a case from which an actuating pin is constantly urged outwardly toward circuit-closing position by spring means, a rigid bell-crank lever comprising two arms at right angles to each other, the fulcrum of said lever being approximately at the junction of said arms, means fixedly connecting one of said switches to each of said arms respectively, a rigid motion-transmitter, and means pivotally mounting the transmitter on said bellcrank lever, the transmitter being operative to transmit motion from said movable element of the prime mover to said bell-crank lever thereby, in response to variations in said physical condition, to change the relative positions of the actuating pins of said switches, said motion-transmitter including an adjustable contact which normally engages the actuating pin of the secondary switch and thereby breaks the circuit at said latter switch.

2. Control apparatus according to claim 1, wherein the switch-supporting bell-crank lever has one of said switches so fixed to each of its arms respectively, that the longitudinal axes of the actuating pins of the two switches are at right angles to each other, the motion-transmitter being a rigid L-shaped lever pivotally connected at the junction of its arms to said switch-supporting bell-crank lever at a point which is on the bisector of the angle between the arms of the bell-crank lever, the arms of the transmitter being disposed, respectively, opposite to the ends of the switch pins, spring means urging the transmitter in a direction such that one of its arms normally holds the pin of the secondary switch in depressed position, the parts being so constructed and arranged that, in response to a predetermined change in said physical condition, the transmitter will rock and depress the pin of the main switch and thereby break the circuit at the latter switch and, in response to further change, in the same direction, in said physical condition, will rock further and thereby release the pin of the secondary switch and close the circuit at said switch.

3. In combination, in apparatus of the class described, a supporting structure, a prime mover mounted thereon, said prime mover comprising a movable actuating element which moves in response to variations in a certain physical condition, switching mechanism comprising a pair of snap-action switches, each having a casing from which an actuating pin is biased outwardly by spring means, characterized in having a single rigid switch support, pivot means defining an axis about which said support may rock, means so attaching the switches to said support that the longitudinal axes of their actuating pins are substantially at right angles to each other and in the same plane, a rigid motion-transmitter which is a bell-crank lever comprising two arms, each of the respective arms of the transmitter being opposed to one of the two switch pins respectively, pivot means approximately at the junction of the arms of the transmitter for pivotally attaching it to the rockable rigid support, the pivot means for the transmitter being spaced radially from the axis about which the switch support rocks, a spring resiliently urging said transmitter to swing in a direction such that one of its arms normally keeps one of the switch pins in depressed position, while the second arm of the transmitter is normally so located as to be ineffective to depress the switch pin which is opposed thereto, the movable actuating element of the prime mover being so located, relatively to the transmitter, as, in response to a predetermined change in said physical condition, to rock the transmitter relatively to the switch support in opposition to said spring, and means for manually adjusting the normal position of the switch support.

4. Apparatus according to claim 3, wherein the rockable switch support is a bell-crank lever, and the two switches are fixed, respectively, to the arms of said lever with their actuating pins substantially at right angles to each other and in a plane perpendicular to the axis about which the bell-crank lever rocks, the fulcrum of the bell-crank switch-supporting lever being adjacent to the junction of its switch-carrying arms, the motion-transmitter being L-shaped, and pivot means located in a radial plane of the axis about which the switch-supporting lever rocks and which connects the transmitter to the bell-crank lever, said pivot means being spaced from the fulcrum of the switch-supporting lever and within the included angle defined by the arms of said lever.

5. Apparatus according to claim 3, further characterized in having means whereby the amount of motion of the transmitter necessary to depress one switch pin and release the other switch pin may be varied.

6. Apparatus according to claim 3, wherein the means for manually adjusting the normal position of the switch support comprises a rotatable cam and a lever arm fixed to said cam for turning the latter, said lever arm comprising an index element arranged to swing over a graduated scale.

References Cited by the Examiner

UNITED STATES PATENTS

| | | | |
|---|---|---|---|
| 2,045,959 | 6/36 | Partlow | 200—56 XR |
| 2,289,882 | 7/42 | Myers | 236—94 XR |
| 2,498,988 | 2/50 | Eden | 200—137 |
| 2,699,481 | 1/55 | Ferris | 200—140 |
| 2,797,272 | 6/57 | Leupold | 200—56 |
| 2,901,578 | 8/59 | Noakes | 200—140 |
| 2,920,155 | 1/60 | Corcoran | 200—56 |

BERNARD A. GILHEANY, *Primary Examiner.*

FREDERICK KETTERER, *Examiner.*